Nov. 30, 1965 J. S. PILCH 3,220,582
TRACTOR MOUNTED COUNTERWEIGHT
Original Filed June 27, 1962 3 Sheets-Sheet 1

INVENTOR.
JOHN S. PILCH
BY
Raymond A. Paquin
ATTORNEY.

Nov. 30, 1965 J. S. PILCH 3,220,582
TRACTOR MOUNTED COUNTERWEIGHT
Original Filed June 27, 1962 3 Sheets-Sheet 2

INVENTOR.
JOHN S. PILCH
BY
*Raymond A. Seguin*
ATTORNEY.

Nov. 30, 1965 J. S. PILCH 3,220,582
TRACTOR MOUNTED COUNTERWEIGHT
Original Filed June 27, 1962 3 Sheets-Sheet 3

INVENTOR.
JOHN S. PILCH
BY
ATTORNEY.

United States Patent Office 3,220,582
Patented Nov. 30, 1965

3,220,582
TRACTOR MOUNTED COUNTERWEIGHT
John S. Pilch, P.O. Box 140, Ware, Mass.
Continuation of application Ser. No. 205,765, June 27, 1962. This application Dec. 10, 1964, Ser. No. 421,740
3 Claims. (Cl. 214—142)

This invention relates to tractors and tractor mounted counterweights for application with a tractor loader or the like and has particular reference to a new and improved means for attaching said counterweights to and detaching them from said tractor loader.

This application is a continuation of my application, Serial Number 205,765, filed June 27, 1962, now abandoned.

An object of the invention is to provide new and improved means for attaching counterweights to and detaching them from a tractor loader whereby said counterweights may be readily and speedily attached to and detached from the tractor loader.

Another object is to provide a new and improved means for attaching and detaching counterweights on a tractor loader whereby such attachment and detachment may be performed by one man working alone without the use of apparatus such as hoists or cranes additional to the tractor loader being fitted with the counter weights.

Another object is to provide a new and improved means for attaching counterweights to a tractor loader whereby the power of such tractor loader may be utilized as the motive force for powering such attachment.

Another object is to provide a new and improved means for attaching counterweights to a tractor loader whereby such attachment may be performed by one man working alone with only the assistance of the power of the tractor loader.

Another object is to provide a new and improved means of the type set forth whereby the contours of the ground upon which the tractor loader and the counterweights rest is not a factor affecting the ease of attachment and detachment of the counterweights from said tractor loader.

A further object is to provide a new and improved means of the type set forth whereby one man may readily and easily attach and detach the counterweights of a tractor loader without the assistance of force additional to that supplied by the tractor loader regardless of the level or condition of the ground upon which rest the tractor loader and counterweights.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims as the preferred form has been given by way of illustration only.

Referring to the drawings.

Figure 1:
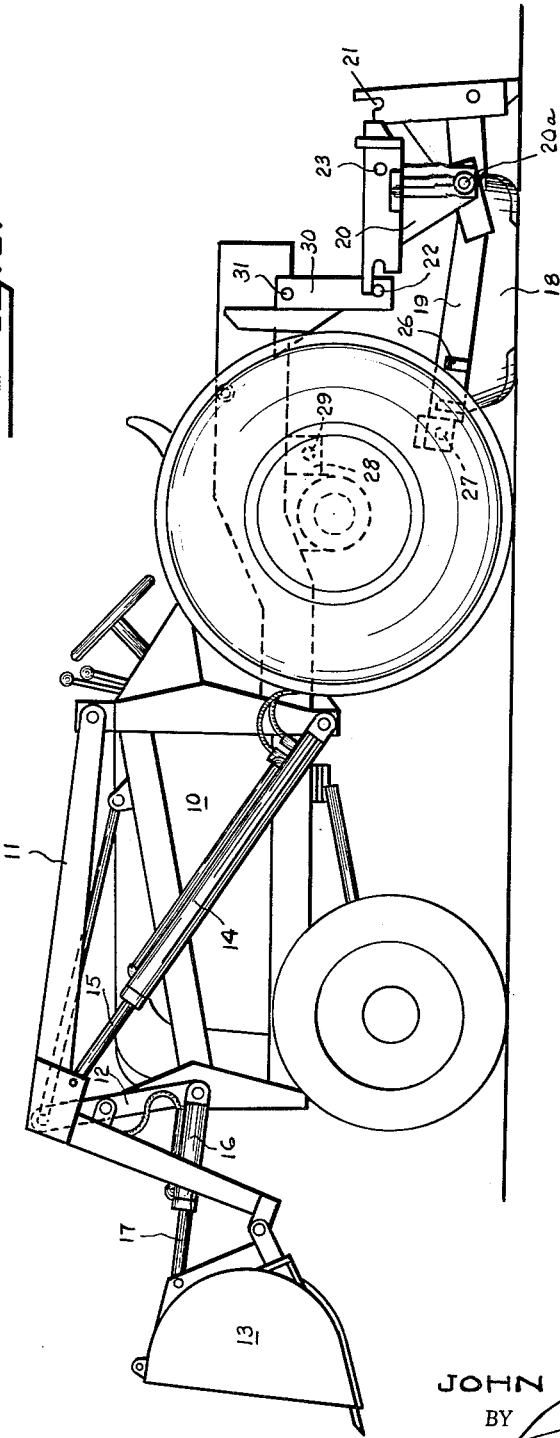
FIG. 1 is a side view of a device embodying the invention with the counterweights in position preparatory to being loaded.
Figure 2:
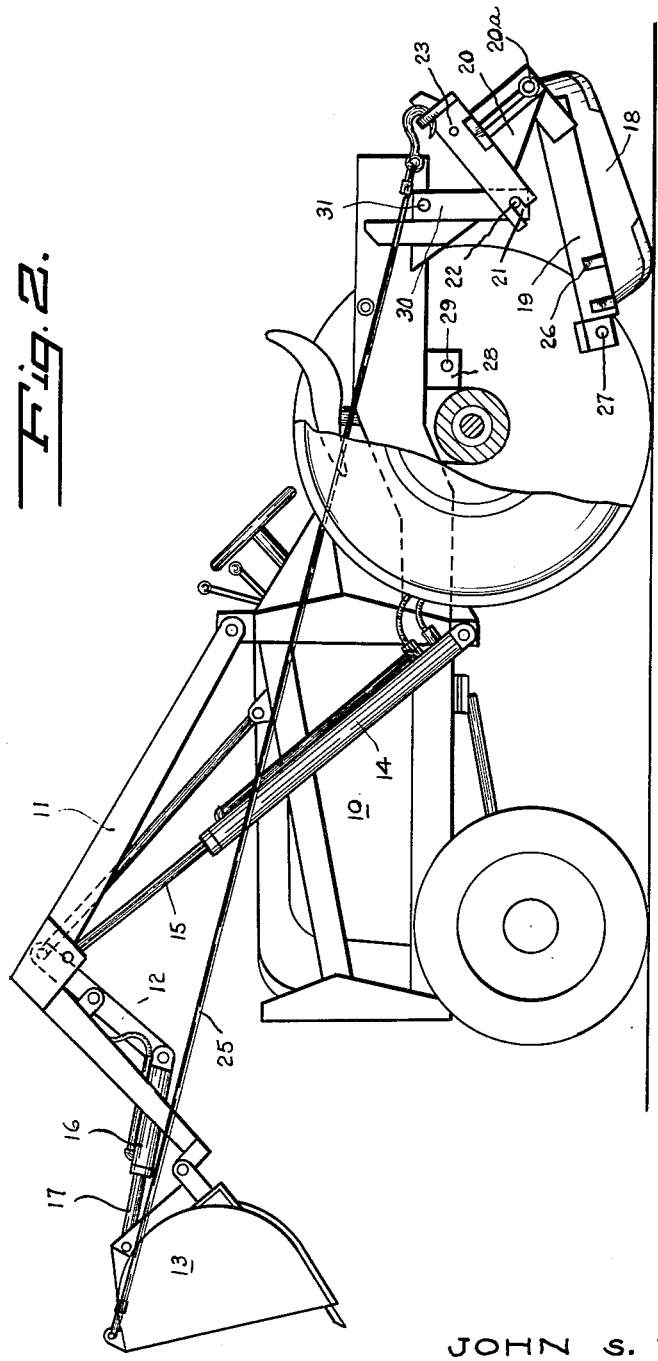
FIG. 2 is a side view of the device embodying the invention shown in FIG. 1 with the counterweights in a partially loaded position.
Figure 3:
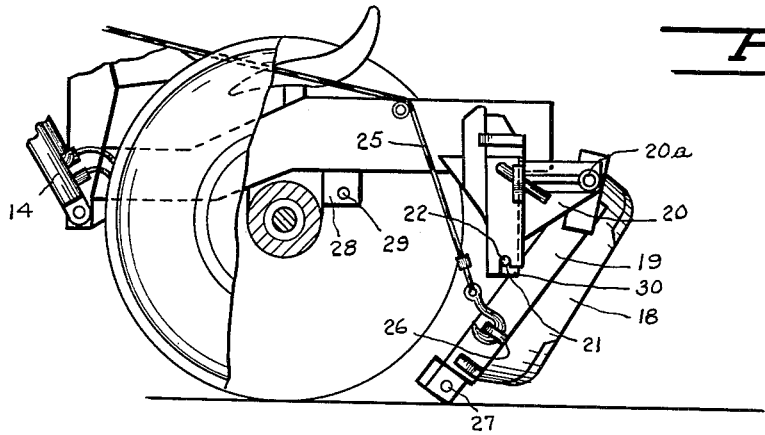
FIG. 3 is a fragmentary view of the tractor mounted loader and counterweight device shown in FIGS. 1 and 2 embodying the invention showing the counterweights in a second partially loaded position.
Figure 4:
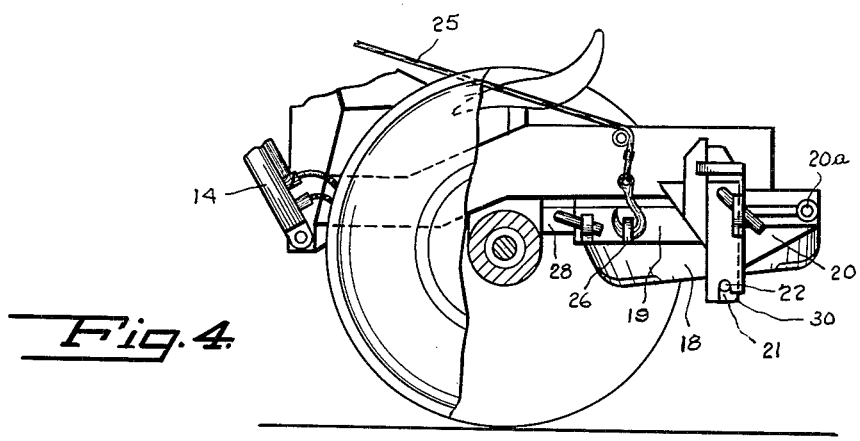
FIG. 4 is a fragmentary view of the tractor loader and counterweight device shown in FIGS. 1 through 3 embodying the invention with the counterweights in operative loaded position.
Figure 5:
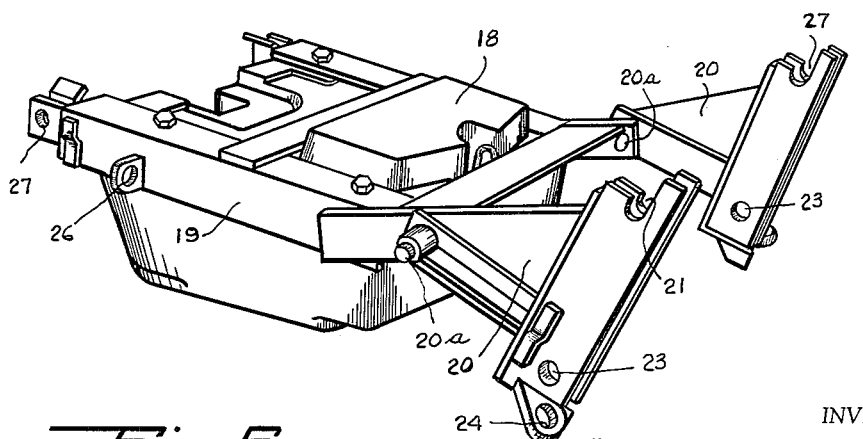
FIG. 5 is a perspective view of the counterweights and their attachment means.

Referring more particularly to the drawings wherein similar reference characters designate corresponding parts throughout the several views, the device shown embodying the invention comprises a tractor 10 having mounted thereon a loader including the loader or push arms 11, linkage 12, bucket 13 and the loader raising and lowering cylinder and ram 14 and 15 respectively. The bucket pivoting mechanism comprises the cylinder 16 and the ram 17 with cylinder 16 being connected to linkage 12.

The weights consist of the counterweights 18 supported in the counterweight frame 19 or support for mounting upon the rear of the tractor 10.

The invention consists of a simple and easy means whereby said counterweights may be readily mounted to and detached from the rear of the tractor 10 by one man working alone without the assistance of any machinery or power other than that of said tractor being fitted with the counterweights regardless of the contour of the terrain upon which the tractor and counterweights rest.

More specifically, the invention consists of the provision of arm members 20 pivotally mounted at 20a upon the counterweight frame 19, which arm members are joined to said frame at the sides of the frame adjacent to its upper face when the frame rests upon the ground in its usual position.

The arm members 20 contain grooves or slots 21 positioned thereon at their upper ends such as to engage and pivot upon, and thereby to cause the counterweight frame 19 and its enclosed counterweights 18 to pivot upon, the pivot pins 22 which pivot pins are mounted upon the rear of the tractor 10 in a manner to be later described.

This positioning of the slots 21 upon the upper ends of the pivotally mounted arms 20 permits the slots to engage the pivot pins 22 regardless of the level and contours of the ground upon which the counterweight frame 19 rests as, by pivoting said arm members to different angles to said counterweight frame, a man loading the counterweights 18 upon the tractor 10 may compensate for variations in the level and contours of the ground. Thus, though the provision of means for varying this angle, variations in the contours of the ground upon which rest the counterweights 18 and the tractor 10 have been made immaterial as concerns the ease and speed with which one man may load said counterweights into operative position upon said tractor.

The arm members 20 contain, also, hole means or openings 23, said hole means being located thereupon at the end of said arm members farthest from the slots 21. Said hole means enable the counterweights 18 once loaded into operative position upon the rear of the tractor 10 to be securely locked into position thereon in a manner to be later described.

Said arm member further includes hole means or openings 24 located adjacent to the hole means 23. Said hole means 24 serve to receive cables 25 which cables serve to connect the arm members 20 to either the bucket 13 or the push arms 12 of the loader apparatus as may be desired. This connection to the arm members 20 through cables 25 permits the operator of the tractor to load the rear of the counterweights 18 into operative position or to unload said counterweights whichever he may desire through the movements of either said bucket 13 or said push arms 12, the determinant factor as to which being dependent upon the placement of connection of the cable on the loader apparatus.

The counterweight frame 19 includes connection means 26 on the two of its opposite sides to which the arm members 20 are attached. Said connection means 26 serve to receive the cables 25, the other ends of which cables 25 are connected to either the bucket 13 or the push arms 12 of the loader device such that the movement of the part of the loader to which the attachment is made moves the front of the counterweight frame 19 and, hence, the enclosed counterweights 18 into either its operative or unloaded position, whichever may be desired by the operator.

Locking hole means or openings 27 are also provided upon the counterweight frame 19 such that the front of the counterweight frame 19 may be locked in their operative position upon the tractor 10 after having been moved to such position by the action of the movement of that portion of that part of the loader to which the cable is attached upon said cable.

Plates 28 including a hole means 29 are provided upon the rear underside of the tractor 10. These hole means 29 are so positioned as to line up or be aligned with the locking hole means 27 in the counterweight frame 19 when the counterweights 18 are in their operative position such that said locking hole means 27 and said hole means 29 may receive a common bolt or similar fastener and the front of the counterweight frame 19 may be held securely in such operative position.

Upon the rear of the tractor 10 and extending downwardly therefrom are mounted the supports 30 containing the pivot pins 22 upon which pivot pins the slots 21 in the arm members 20 ride when the cable means 25 is connected into hole means 24 for use in moving the rear of the counterweights 18 into operative position. These pivot pins 22 further serve to support the rear of the counterweights 18 while in operative position and the tractor 10 is in normal operating use.

Said supports further include at their upper ends locking holes 31. These locking holes 31 are so positioned in said supports as to be aligned with and capable of sharing bolts or similar fastening device with hole means 23 when the arm members 20 containing said hole means 23 have been pivoted upon the pivot pins 22 into their operative upright position. The insertion of the bolts or similar fastening means through the aligned locking holes 31 and hole means 23 thus serves to maintain the rear portion of the counterweights 18 in operative position.

In operation, when the operator of the tractor loader desires to load the counterweights 18 into operative position, he merely backs the tractor 10 up such that the tractor 10 is within reach of the upper portions of the arm members 20. He need not select level ground for the purposes of this attachment as one of the features of this invention is the provision of a means whereby counterweights may be attached to and detached from a tractor regardless of the contours of the ground upon which the tractor and counterweights rest.

Next, the operator pivots the upper portion of the arm members 20 such that the slots 21 rest on the pivot pins 22 on the support 30 on the rear of the tractor 10. Then the cables 25 are attached to the hole means 24 and to either the bucket 13 or the push arms 12 of the loader. Then through the movement of either the bucket 13 or the push arms 12 of the loader depending upon which connection has been made, the rear of the counterweights 18 are pulled into position upon the rear of the tractor 10. Bolts or similar fastening are then placed through both locking holes 31 and hole means 23 such that the rear of the counterweights 18 will be held securely in position upon the tractor 10.

The cables 25 are detached from the hole means 24 and attached to the connection means 26 on the sides of the counterweight frame 19. Then, through the mechanical force of the tractor loader, more specifically, through the movement of either the bucket 13 or the push arms 12 of the loader depending upon, as was before stated, to which the cables 25 have been attached, the front end of the counterweights are pulled into position on the tractor.

Bolts or similar fastenings are placed through the locking hole means 27 in the counterweight frame 19 and the hole means 29 on plates 28 mounted upon the tractor, the cables 25 are detached and the counterweights 18 are firmly and securely attached to the tractor loader, which is now ready for normal operation.

To detach the counterweights 18 from the tractor, the operator simply reverses this procedure.

From the foregoing, it will be seen that I have provided a new and improved means whereby counterweights may be readily and speedily attached to and detached from a tractor by one man working alone with only the assistance of the power of the tractor being fitted with the counterweights regardless of the contours of the ground upon which rests the tractor and the counterweights.

From the foregoing, it will be seen that I have provided new and improved means for obtaining all of the objects and advantages of the invention.

I claim:

1. In combination, a vehicle provided with support means to support a counterweight, and a counterweight, said support means including a pivot, and said counterweight being provided with a lifting lever pivoted to said counterweight, said lifting lever being provided with means to engage said pivot on said support means when said counterweight is lying on the ground and said lifting lever being provided wtih a connection whereby a tension cable secured to said lever will rotate said lever about said pivot on said support means to lift said counterweight from the ground when said cable is tensioned.

2. In combination, a vehicle provided with support means to support a counterweight, and a counterweight, said support means including a pair of spaced pivots, and said counterweight being provided with a pair of lifting levers pivoted to said counterweight, said lifting levers each being provided with means to engage one of said pivots on said support means when said counterweight is lying on the ground and one of said lifting levers being provided with a connection whereby a tension cable secured to said lever will rotate said lever about said pivot on said support means to lift one end of said counterweight from the ground when said cable is tensioned, whereby said end of said counterweight may be connected to said support means, and connection means on said counterweight whereby a tension cable secured thereto will rotate said counterweight from the ground to a position where it may be connected to said support means.

3. In combination, a vehicle provided with support means to support a counterweight, and a counterweight, said support means including a pivot, and said counterweight being provided with a lifting lever pivoted to said counterweight, said lifting lever being provided with means to engage said pivot on said support means when said counterweight is lying on the ground and said lifting lever being provided with a connection whereby a tension cable secured to said lever will rotate said lever about said pivot on said support means to lift said counterweight from the ground when said cable is tensioned, whereby said end of said counterweight may be connected to said support means, and connection means on said counterweight whereby a tension cable secured thereto will rotate said counterweight from the ground to a position where it may be connected to said support means.

References Cited by the Examiner

UNITED STATES PATENTS

| 2,722,320 | 11/1955 | Dobeus et al. | 212—8 |
| 2,820,556 | 1/1958 | Davis | 214—142 |

FOREIGN PATENTS 208,133  10/1955  Australia.

HUGO O. SCHULZ, *Primary Examiner.*